(12) United States Patent
Carlson et al.

(10) Patent No.: US 9,235,386 B2
(45) Date of Patent: *Jan. 12, 2016

(54) GENERATING REUSABLE SOFTWARE ASSETS FROM DISTRIBUTED ARTIFACTS

(75) Inventors: Brent A. Carlson, Rochester, MN (US);
Timothy J. Graser, Rochester, MN (US); Dave H. Gross, Rochester, MN (US); Debra L. Mariner, Oronoco, MN (US); John J. Palof, Kenyon, MN (US); Paul W. Tamminga, Rochester, MN (US)

(73) Assignee: AKANA, INC., Los Angeles, CA (US)

( * ) Notice: Subject to any disclaimer, the term of this patent is extended or adjusted under 35 U.S.C. 154(b) by 1889 days.

This patent is subject to a terminal disclaimer.

(21) Appl. No.: 12/016,668

(22) Filed: Jan. 18, 2008

(65) Prior Publication Data
US 2008/0133558 A1 Jun. 5, 2008

Related U.S. Application Data

(63) Continuation of application No. 10/100,749, filed on Mar. 18, 2002, now Pat. No. 7,322,024.

(51) Int. Cl.
*G06F 17/30* (2006.01)
*G06F 9/44* (2006.01)

(52) U.S. Cl.
CPC ........... *G06F 8/36* (2013.01); *Y10S 707/99944* (2013.01)

(58) Field of Classification Search
CPC ........................... Y10S 707/99944; G06F 8/36
USPC ................................................. 717/120, 116
See application file for complete search history.

(56) References Cited

U.S. PATENT DOCUMENTS 5,361,355 A 11/1994 Kondo et al.
5,446,575 A 8/1995 Lysakowski, Jr.
(Continued)

FOREIGN PATENT DOCUMENTS

EP 0 667 572 A1 8/1995
EP 1 061 430 A1 12/2000
(Continued)

OTHER PUBLICATIONS

Naoto Itsuki et al., "A Component Reuse Method in Constructing Information Systems," NTT R&D, vol. 47, No. 8, 1998, pp. 877-882 (Abstract in English).
(Continued)

*Primary Examiner* — Li B Zhen
*Assistant Examiner* — Viva Miller
(74) *Attorney, Agent, or Firm* — Shumaker & Sieffert, P.A.

(57) ABSTRACT

In general, techniques are described that facilitate the reuse of software assets within an enterprise. A software asset, as used herein, refers to a set of one or more related artifacts that have been created or harvested for the purpose of applying that asset repeatedly in subsequent development environments. A system, for example, is described that includes a repository to store artifacts, and an asset source to generate a software asset based on the artifacts. The system further includes an asset management system to receive the software asset from the asset source and store the software asset within an asset library. The system may further include a model having one or more elements, and an asset retrieval module to selectively retrieve a subset of the software assets from the asset library based on input from a user identifying one or more of the elements.

46 Claims, 8 Drawing Sheets

(56) References Cited

U.S. PATENT DOCUMENTS

| | | |
|---|---|---|
| 5,642,511 A | 6/1997 | Chow et al. |
| 5,867,707 A | 2/1999 | Nishida et al. |
| 5,907,704 A | 5/1999 | Gudmundson et al. |
| 5,980,096 A | 11/1999 | Thalhammer-Reyero |
| 5,991,535 A | 11/1999 | Fowlow et al. |
| 6,023,702 A | 2/2000 | Leisten et al. |
| 6,055,543 A | 4/2000 | Christensen et al. |
| 6,067,548 A | 5/2000 | Cheng |
| 6,092,075 A | 7/2000 | Carey et al. |
| 6,134,706 A | 10/2000 | Carey et al. |
| 6,202,205 B1 | 3/2001 | Saboff et al. |
| 6,230,315 B1 | 5/2001 | Nicholas |
| 6,349,237 B1 | 2/2002 | Koren et al. |
| 6,366,930 B1 | 4/2002 | Parker et al. |
| 6,405,179 B1 | 6/2002 | Rebane |
| 6,427,230 B1 | 7/2002 | Goiffon et al. |
| 6,606,744 B1 | 8/2003 | Mikurak |
| 6,640,249 B1 | 10/2003 | Bowman-Amuah |
| 6,662,357 B1 | 12/2003 | Bowman-Amuah |
| 6,678,882 B1 | 1/2004 | Hurley et al. |
| 6,829,604 B1 | 12/2004 | Tifft |
| 7,080,355 B2 | 7/2006 | Carlson et al. |
| 7,080,371 B1 * | 7/2006 | Arnaiz et al. ................ 717/170 |
| 7,149,734 B2 | 12/2006 | Carlson et al. |
| 7,322,024 B2 | 1/2008 | Carlson et al. |
| 2002/0073114 A1 | 6/2002 | Nicastro et al. |
| 2002/0156702 A1 | 10/2002 | Kane |
| 2002/0158880 A1 | 10/2002 | Williams et al. |
| 2002/0169658 A1 | 11/2002 | Adler |
| 2003/0005412 A1 * | 1/2003 | Eanes ........................ 717/120 |
| 2003/0182470 A1 | 9/2003 | Carlson et al. |
| 2006/0265688 A1 | 11/2006 | Carlson et al. |
| 2007/0033567 A1 | 2/2007 | Carlson et al. |

FOREIGN PATENT DOCUMENTS

| | | |
|---|---|---|
| WO | WO 00/22518 | 4/2000 |
| WO | WO 02/41144 A1 | 5/2002 |
| WO | WO 02/061538 A2 | 8/2002 |
| WO | WO 03/005243 A1 | 1/2003 |

OTHER PUBLICATIONS

R. Rada, "Software Reuse," Intellect™, Oxford, England, 1995, 81 pgs.

S. Jarzabek, "Domain Model-Driven Software Reengineering and Maintenance," Journal of Systems and Software USA, vol. 20, No. 1, 1993, pp. 37-51.

P. Devanbu et al., "Extracting Formal Domain Models from Existing Code for Generative Reuse," ACM SIGAPP Applied Computing Review, vol. 5, No. 1, 1997, pp. 2-14.

W. Frakes et al., "DARE: Domain analysis and reuse environment," Annals of Software Engineering, vol. 5, 1998, pp. 125-141.

* cited by examiner

GENERATING REUSABLE SOFTWARE ASSETS FROM DISTRIBUTED ARTIFACTS

This application is a continuation and claims priority from U.S. Patent Application entitled "Generating Reusable Software Assets from Distributed Artifacts," filed Mar. 18, 2002, and having U.S. Ser. No. 10/100,749, the entire contents of which is incorporated herein by reference.

TECHNICAL FIELD

The invention relates to computer software and, more particularly, managing reusable software assets.

BACKGROUND

Over the past several years, software development efforts within enterprises have grown tremendously, resulting in large volumes of software code, documentation, models, and other related artifacts. A large enterprise, for example, may have a significant number of ongoing software development projects at any one time ranging in size from small projects involving a handful of programmers to massive endeavors involving hundreds of programmers.

In the past few years, there has been a tremendous amount of work in the area of software engineering and, in particular, the reuse of software across development projects. Reusing software can have significant advantages in, for example, reducing the resources, expense, and development time for a software project. Identifying artifacts for reuse from the various repositories of a given enterprise, however, can be a complex task. In addition to the problems involved in identifying a potentially massive number of artifacts, the artifacts are typically stored within repositories dispersed throughout the enterprise, and maintained by specialized development or operational environments.

SUMMARY

In general, the invention is directed to techniques that facilitate the reuse of software assets within an enterprise. A software asset, as used herein, refers to a set of one or more related artifacts that have been created or harvested for the purpose of applying that asset repeatedly in subsequent development environments. Source code and binary code are examples of artifacts for software assets. Other examples of artifacts include related documentation, such as requirement specifications, design documents, operation manuals, and the like. Additional examples of artifacts include models, such as a process model, structural model, resource model, implementation model, and the like, that may include use cases, object models, collaboration diagrams, deployment models, and the like.

In one embodiment, a system comprises a repository to store artifacts, and an asset source to generate a software asset based on the artifacts. The system further comprises an asset management system to receive the software asset from the asset source and to store the software asset within an asset library.

In another embodiment, a system comprises a plurality of repositories to store artifacts, and asset templates that define schemas for reusable software assets in accordance with a data description language. The system further comprises a plurality of asset sources to monitor the repositories and generate software assets having metadata that reference the artifacts in accordance with schemas of the asset templates, and an asset management system to receive the software assets from the asset sources and store the software assets within an asset library.

In another embodiment, a system comprises a plurality of repositories to store artifacts, and a multi-level hierarchy of asset sources to generate software assets having metadata that reference the artifacts. The higher-level asset sources of the hierarchy receive software assets from low-level asset sources of the hierarchy and form aggregate software assets. The system further comprises an asset management system to receive the aggregate software assets from the hierarchy of asset sources and store the aggregate software assets within an asset library.

In another embodiment, a system comprises a model having one or more elements, and a database to store reusable software assets. The system further comprises an asset retrieval module to receive input from a user selecting an element of the model, and to selectively retrieve a subset of the software assets from the database based on the input.

In another embodiment, a method comprises retrieving artifacts from repositories, and generating software assets based on the artifacts in a form that conforms to a data description language. The method further comprises publishing the software assets for storage within an asset library.

In another embodiment, a method comprises receiving input from a user selecting one or more elements of a model, and retrieving software assets from an asset library based on the selected elements.

In another embodiment, a computer-readable medium comprises instructions to cause a processor to receive input from a user selecting one or more elements of a model, and retrieve software assets from an asset library based on the selected elements.

In another embodiment, a computer-readable medium comprises data structures that store software models having elements, and software assets having metadata that maps the software asset to the elements of the software models.

The techniques described herein may offer one or more advantages. For example, an enterprise may make use of distributed asset sources to provide generalized interfaces to diverse repositories, and to generate software assets in a normalized form that complies with a data description language. The software assets may be generated, for example, in accordance with one or more asset templates that define schemas for the assets. A user, such as a library administrator, may readily modify the asset templates to easily control the content and structure of the reusable software assets. This level of abstraction can be leveraged to automate or semi-automate the process of capturing artifacts from the repositories. In this manner, the asset management system provides users with a centralized asset library that offers a consistent, normalized view of the artifacts maintained over the many diverse repositories. In addition, an enterprise can make use of the system for bulk entry of assets, thereby simplifying and accelerating the process of capturing legacy software assets within the enterprise.

The asset management system can be configured to provide a full range of asset capture activities, ranging from fully-automated asset capture to semi-automated or manual approaches that require at least some manual intervention during the capture process. Accordingly, the asset management system can be configured to automatically capture assets from the repositories and produce normalized assets, or to automatically require the augmentation of the assets with artifacts not present within the repositories.

Among many other possible advantages, the asset management system provides for the association of software assets captured from diverse repositories with elements of software models, such as a process model, a structural model, a resource model, an implementation model, and the like. Accordingly, users can develop specifications for software projects, for example, and easily identify reusable software assets within the asset library that may be leveraged for the project.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
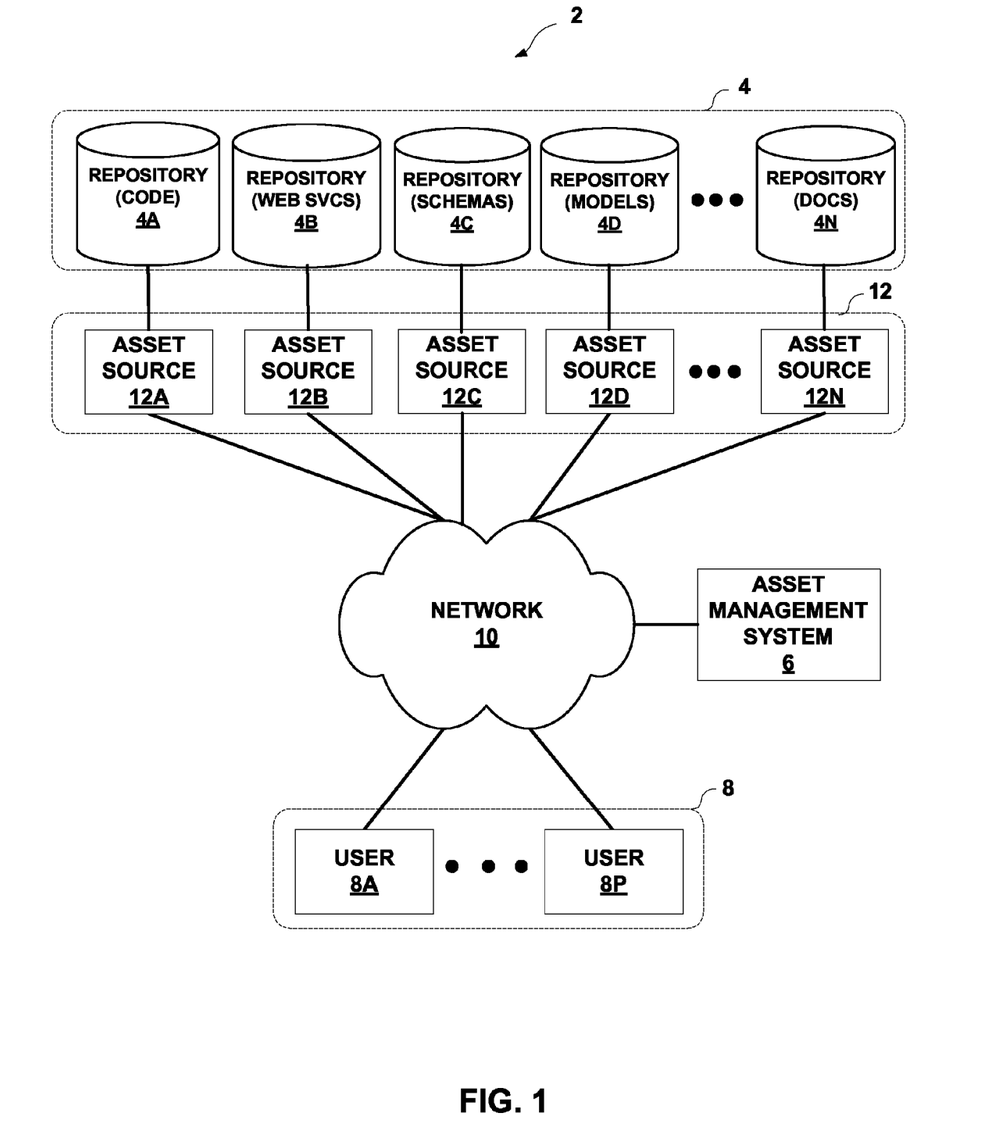
FIG. 1 is a block diagram illustrating an example system that facilitates the reuse of assets within an enterprise generally.

FIG. 1 is a block diagram illustrating an example system 2 that facilitates the reuse of software assets within an enterprise generally. In general, a reusable software asset, as used herein, refers to a set of related artifacts that have been created or harvested for the purpose of applying that asset repeatedly in subsequent development environments. Examples of artifacts for software assets include the source code or binary code for the software asset. Other examples include documentation such as a requirements specification, design document, and the like. Additional examples of artifacts include use cases, object models, collaboration diagrams, deployment models, and the like. Further examples include operational artifacts deployed within operational environments of the enterprise, such as component instances deployed within an application server.

Repositories 4A-4N (herein repositories 4) represent any data source within an enterprise that stores information (herein artifacts) relevant to the management of reusable assets. Repository 4A may store, for example, reusable software components. These components are typically independently deployable code elements that often conform to a standardized component model, such as Enterprise JavaBeans (EJB) and the Component Object Model (COM). These components typically have well-defined interfaces that provide access to the encapsulated services or functions. An example of this type of repository includes a source code development environment that often stores the source code and the executable code within a repository to provide version control and to facilitate collaborative development.

As another example, repository 4B may store code elements that present functional interfaces to web services (web svcs) for remote access by client software via networking protocols, such as HTTP, HTTPS, FTP, SOAP, XML messaging, and the like. The enterprise may make use of these assets for quickly assembling web-based applications. One example of this type of software asset includes a server-side code element for providing web-based financial transactions.

As another example, repository 4C may store schemas that conform to a data description language, such as XML, that can be used to assemble metadata for data transfer within the enterprise. Repository 4D may store modeling information (models) that provides formal representations of various software components. The modeling information may include use cases, object models, collaboration diagrams, deployment models, and the like. The modeling information may conform to the Unified Modeling Language (UML), for example. Repository 4N may store documentation related to the software components, including requirements specifications, design documents, and the like.

In addition, the artifacts stored by repositories 4 are not limited to those artifacts generated during the development of the software components, but can encompass artifacts related to the deployment of the asset, such as particular instances of the software components. Accordingly, system 2 can be used to aggregate artifacts generated through the lifecycle of the asset, including artifacts generated during the development of the asset through the deployment of various instances of the asset, and artifacts generated through ongoing tracking of that asset within the operational environment. Examples of operational artifacts deployed within operational environments of the enterprise include component instances deployed within an application server.

Repositories 4 may also comprise "active" repositories that manage data related to an asset in arbitrary form, and present "views" of that assemble the data into a consumable form. For example, a defect tracking system may manage any number of defects that can be organized into views related to specific assets, e.g., views that show only those defects pertinent to particular versions of assets under development.

Generally, these artifacts are likely developed and maintained within repositories 4 using specialized development tools. Accordingly, repositories 4 may comprise a variety of storage facilities having very diverse interfaces. System 2 makes use of one or more asset sources 12A-12N (herein asset sources 12) that provide a generalized, abstract interface to the underlying repositories 4. Asset sources 12 interact with repositories 4 to extract the artifacts, and assemble related artifacts to provide composite, normalized views of the reusable software assets. In particular, asset sources 12 generate asset descriptions that describe the related artifacts for each asset in a normalized form.

Asset sources 12 output the software assets in a normalized form that complies with a data description language. In other words, the software assets include or reference artifact data from repository 4A, as well as metadata that conforms to the data description language. The data description language describes the format, organization and structure of the asset. Accordingly, the normalized assets produced by asset sources 12 may take the form of electronic documents, files, scripts, data streams, software objects, and the like, that contain the metadata conforming to the data description language. Other example languages include Extensible Style Language (XSL), Extensible Linking Language (XLL), Standardized Multimedia Authoring Language (SMIL), as well as variations of the Standard Generalized Markup Language (SGML).

As described in detail below, users 8A can readily tailor each of asset sources 12 to the particular requirements of the corresponding one of repositories 4. As described in detail below, users 8 may use asset definition templates to generically describe the normalized assets produced by asset sources 12.

Asset management system 6 provides a centralized resource for collecting the asset descriptions from asset sources 12, and for publishing the asset descriptions to make the descriptions available to users 8A-8P (herein users 8) within the enterprise. More specifically, asset management system 6 provides a comprehensive, searchable view of the software assets and related artifacts stored within the various repositories 4. By interacting with asset management system 6, users 8 can identify and make use of the assets.

System 2 may provide one or more advantageous features for capturing and managing reusable software assets. The use of asset sources 12 to provide a generalized interface to diverse repositories 4 can be leveraged to automate or semi-automate the process of capturing artifact information from repositories 4. Accordingly, an enterprise can make use of system 2 for bulk entry of assets, thereby simplifying and accelerating the process of capturing legacy software assets within the enterprise. In addition, asset management 6 and asset source 12 provide users 8 with a consistent, normalized view of the artifacts maintained over the many diverse repositories 4. Furthermore, asset management system 6 and asset sources 12 may interact so as to provide a current view of repositories 4, even though repositories 4 may change over time.

Furthermore, asset management system 6 and asset sources 12 can be configured to provide a full range of asset capture activities, ranging from fully-automated asset capture to semi-automated or manual approaches that requires at least some manual intervention of users 8 during the capture process. Accordingly, asset management system 6 and asset sources 12 automatically make available to users 8 assets that are automatically generated from repositories 4. In addition, asset management system 6 and asset sources 12 can be configured to allow users 8 to augment the assets with artifacts not present within repositories 12 during the capture process.

Figure 2:
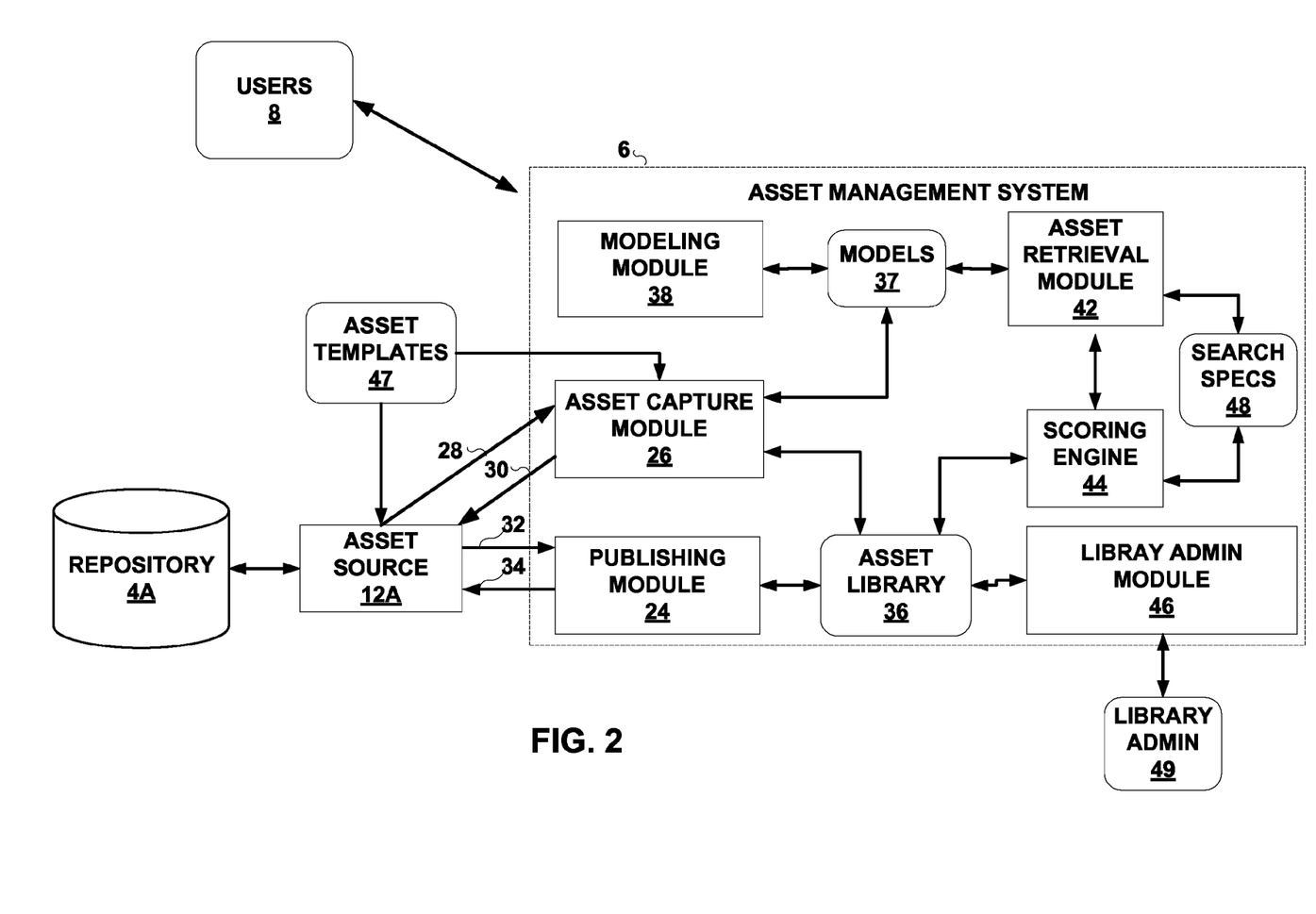
FIG. 2 is a block diagram illustrating an example embodiment of an asset management system.

FIG. 2 is a block diagram illustrating an example embodiment of asset management system 6 of FIG. 1. Asset management system 6 comprises a number of cooperative modules that facilitate the management of reusable software assets.

For example, asset management system 6 may include publishing module 24 and asset capture module 26 that interact with asset sources 12 to collect and aggregate artifacts from repositories 4 (FIG. 1), such as asset source 12A and repository 4A, as illustrated for exemplary purposes in FIG. 2. Generally, asset source 12A collects and normalizes assets from repository 4A. In addition, asset source 12A provides an abstract interface for interaction with publishing module 24 and asset capture module 26, thereby hiding the specific requirements of repository 4A from these modules.

In general, asset capture module 26 can augment the information extracted from repository 4A, and provides for resolution of conflicts between the extracted information and information required for publication of the asset by asset source 12A. Upon receiving notification 28 from asset source 12A indicating the availability of a new or updated asset, asset capture module 26 issues one or more messages 30 to asset source 12A to retrieve the asset. Messages 30 may comprise, for example, Simple Object Access Protocol (SOAP) messages, Remote Method Invocation (RMI) calls, or any other mechanism for communication between modules. In addition, asset capture module 26 may access asset library 36 to retrieve a current instance of the asset being produced by asset source 12A. Asset capture module 26 may present the current instance of the asset as well as the asset produced by asset 12A to user 39 for reconciliation.

Asset source 12A and asset capture module 26 make use of asset templates 47 to validate the asset information. In one embodiment, asset source 12A, or a schema generation module, generates a virtual schema in accordance by applying asset templates 47 to a base schema for an asset. Asset templates conform to a data description language, such as the extensible markup language (XML), and may include definition templates and constraint templates. The base schema conforms to a schema definition language, and defines a class of elements that conform to the data description language. In this manner, the base schema may remain static and need not be modified to support new classes of assets.

To define classes of permissible assets, a user, such as one of users 8 or library administrator 49, may create definition templates, constraint templates, or both. More specifically, the user may create one or more definition templates that define sub-classes for the elements defined by base schema. In this manner, the user can extend the element definitions of base schema without modifying base schema.

In addition, the user may create one or more constraint templates that define requirements for instances of the elements. Constraint templates may define requirements for instances of elements belonging to the classes defined by base schema, instances of elements belonging to the sub-classes defined by definition templates, or both. For example, constraint templates may define a required cardinality for the instances of the elements, a required minimum or maximum number of the instances, a range for a required number of the instances of the elements, a required attribute for the instances, a required parameter value for the instances of the elements, specific required instances of the elements, and the like.

Asset source 12A generates the schema information of virtual schema by first generating a data structure representing the classes of elements defined by base schema. Asset source 12A then applies definition templates to base schema to extend the schema information to include the sub-classes of elements defined within definition templates. Finally, Asset source 12A applies constraint templates to update the schema information to include the restrictions defined by constraint templates.

Definition templates and constraint templates conform to the data description language to which the elements of base schema comply, e.g., XML. Accordingly, the user can easily create and modify definition templates and constraint templates, and need only modify base schema in order to support new classes of assets.

Asset source 12A and asset capture module 26 may use asset templates 47 to drive the asset capture process. Based on the content and structure described by the asset schemas, which may be dynamically generated from asset templates 47, asset source 12A and asset capture module 26 identify any incomplete artifact data that needs to be added to the capture asset, either manually or in automated fashion. In this manner, asset source 12A can produce assets in a normalized form that complies with the schema information. The assets are normalized in the sense that the assets are described in a data description language, such as XML, and the elements and attributes are substantially similar.

The following pseudocode illustrates an exemplary base schema, definition template and constraint template that may be used for capturing information related to reusable software assets. In particular, the following exemplary base schema defines a parent class of elements named ASSET, and two child classes of elements named KEYWORD and RELATION.

```
<XSD:SCHEMA >
    <XSD:ELEMENT NAME="ASSET">
        <XSD:ELEMENT NAME="KEYWORD" MINOCCURS="0" MAXOCCURS="UNBOUNDED">
            <XSD:ATTRIBUTE NAME="NAME" TYPE="XSD:STRING" USE="REQUIRED "/>
            <XSD:ATTRIBUTE NAME="VALUE" TYPE="XSD:STRING" USE="REQUIRED"/>
        </XSD:ELEMENT>
        <XSD:ELEMENT NAME="RELATION" MINOCCURS="0" MAXOCCURS="UNBOUNDED">
            <XSD:ATTRIBUTE NAME="ROLE" TYPE="XSD:STRING" USE="REQUIRED"/>
            <XSD:ATTRIBUTE NAME="ID" TYPE="XSD:ID" USE="REQUIRED"/>
            <XSD:ATTRIBUTE NAME="TYPE" TYPE="XSD:STRING" USE="REQUIRED"/>
        </XSD:ELEMENT>
        <XSD:ATTRIBUTE NAME="NAME" TYPE="XSD:STRING" USE="REQUIRED"/>
        <XSD:ATTRIBUTE NAME="TEMPLATE" TYPE="XSD:STRING" USE="REQUIRED"/>
    </XSD:ELEMENT>
</XSD:SCHEMA>
```

The following exemplary definition template illustrates the definition of sub-classes for the classes of elements KEYWORD and RELATION, thereby extending the definitions provided by the above-listed exemplary base schema.

```
<TEMPLATE NAME="ASSET-DEFINITION-TEMPLATE" PARENT="ASSET-SCHEMA.XSD">
    <DEFINE-KEYWORD NAME="CATEGORY" TYPE="STRING">
        <ADD-VALUE VALUE="FINANCE"/>
        <ADD-VALUE VALUE="BANKING"/>
    </DEFINE-KEYWORD>
    <DEFINE-KEYWORD NAME="PRICE" TYPE="DECIMAL"/>
    <DEFINE-KEYWORD NAME="ALIAS" TYPE="STRING"/>
    <DEFINE-RELATION ROLE="USES" TYPE="ASSOCIATION"/>
    <DEFINE-RELATION ROLE="PREDECESSOR" TYPE="PREVIOUS-VERSION">
        <MAX-OCCURS VALUE="1"/>
    </DEFINE-RELATION>
</TEMPLATE>
```

The above-illustrated exemplary definition template makes use of elements DEFINE-KEYWORD and DEFINE-RELATION to define specific sub-classes for these respective classes of elements defined by the exemplary base schema. More specifically, for class KEYWORD, the exemplary definition template defines a sub-class CATEGORY having two possible values: FINANCE and BANKING. The exemplary definition template defines two additional sub-classes for the class KEYWORD including PRICE and ALIAS. For the class RELATION, the definition template defines two sub-classes of USES and PREDECESSOR.

The following exemplary constraint template provides requirements for the use of, and constraints for, the instances of the elements.

```
<TEMPLATE NAME="ASSET-CONSTRAINT-TEMPLATE"
PARENT="ASSET-DEFINITION-TEMPLATE.XML">
    <USE-KEYWORD NAME="CATEGORY"/>
    <USE-KEYWORD NAME="PRICE">
        <MAX-OCCURS VALUE="1"/>
    </USE-KEYWORD>
    <USE-RELATION ROLE="PREDECESSOR"/>
    <USE-RELATION ROLE="USES">
        <MIN-OCCURS VALUE="1"/>
    </USE-RELATION>
</TEMPLATE>
```

The above-illustrated exemplary constraint template makes use of elements USE-KEYWORD and USE-RELATION to define specific requirements for instances for the sub-classes of elements defined by the definition template. More specifically, the exemplary constraint template 10 allows at least one instance of an element belonging to the sub-class CATEGORY. The exemplary constraint template further allows at most one instance of an element belonging to the sub-class PRICE. Similarly, the exemplary constraint template allows at least one instance of an element belonging to the sub-class PREDECESSOR, and requires at least one instance of an element belonging to the sub-class USES.

The following pseudocode illustrates an exemplary document that describes a reusable software asset, and which complies with the exemplary base schema, definition template, and constraint template listed above.

```
<ASSET NAME="BANKING-ASSET-2.0" TEMPLATE="ASSET-CONSTRAINT-TEMPLATE.XML">
    <KEYWORD NAME="CATEGORY" VALUE="BANKING"/>
    <KEYWORD NAME="PRICE" VALUE="100.00"/>
    <RELATION ROLE="USES" ID="CURRENCY-ASSET-4.1" TYPE="ASSOCIATION"/>
    <RELATION ROLE="PREDECESSOR" ID="BANKING-ASSET-1.0" TYPE="PREVIOUS-
VERSION"/>
</ASSET>
```

The form of asset capture module 26 may vary depending on whether asset management system 6 is configured for manual, semi-automated, or automated asset capture. Asset capture module 26 may comprise, for example, editing tools by which a user 39 can manually supply information to complete or augment the information captured from repository 4A. In addition, the user may interact with the editing tools to resolve any conflicts between the extracted asset information and the required information. For semi-automated or automated environments, asset capture module 26 may invoke one or more scripts to automate the augmentation of information with the asset information extracted by asset source 20. Asset capture module 26 may be embedded within asset management system 6 as illustrated, or remotely connected to the asset management system 6.

In some fully automated environments, asset source 12A may bypass asset capture module 26 by withholding notification 28, and may issue notification 32 to publishing module 24 indicating that the asset is ready for publishing to asset library 36. In fully automated environments, asset source 12A validates the asset information using asset definition templates 47.

Upon receiving notification 32, publishing module 24 issues messages 34 to asset source 12A to retrieve the normalized asset from asset source 12A. Upon retrieving the normalized asset, publishing module 24 stores the asset within asset library 36.

Asset management system 6 may further include a modeling module 38 that allows users 8 to develop models 37 that represent functionality of interest to the enterprise. For example, user 8 may interact with modeling module 38 to develop models 37 that may include process models, structural models, resource models, implementation models, and the like, for a software development project. Modeling module 38 may comprise an integrated proprietary modeling tool, or any conventional modeling tool capable of producing modeling information, such as Rational Rose™ from the Rational Software Corporation of Cupertino, Calif., or combinations of both such tools.

Asset retrieval module 42 allows users 8 to access and manage asset data within asset library 36. In particular, asset retrieval module 42 allows one or more users 8 to develop model-driven search specifications (search specs) 48. In other words, asset retrieval module 42 allows users 8 to select elements from one or more of models 37 to build search specifications 48. Scoring engine 44 scores each asset published by publishing module 24 against search specifications 48 to aid in identifying the most relevant assets within asset library 36. In this manner, users 8 can selectively retrieve assets from asset library 36 using modeling data from models 37 to guide the search process. Asset library 36 may be implemented as any data source, such as a relational database management system (RDBMS), an object-oriented database, flat files, and the like.

Library administration (admin) module 46 provides an interface by which library administrator 49 can manage asset library 36. For example, library administrator 49 may define rules that control the development of search specifications 48. In addition, library administrator 49 may edit asset templates 47 to define new asset types or update the schemas for existing asset types.

Figure 3:
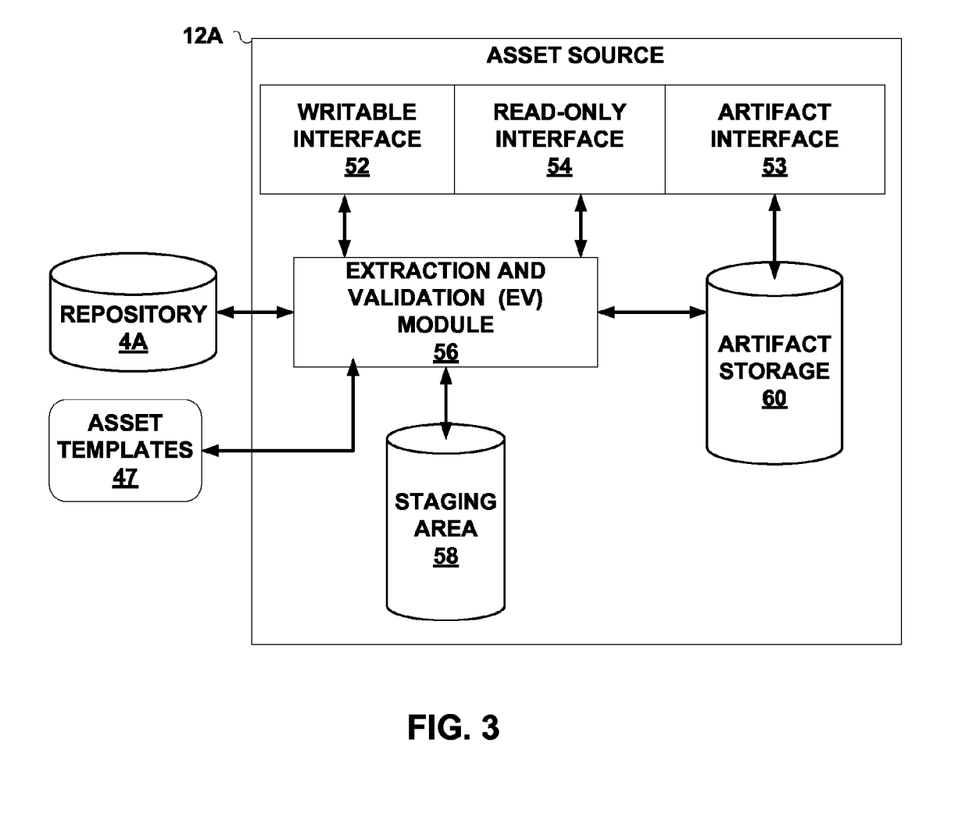
FIG. 3 is a block diagram illustrating an example embodiment of an asset source.

FIG. 3 is a block diagram illustrating an example embodiment of asset source 12A. Extraction and validation (EV) module 56 provides the core logic of asset source 12A, and may include one or more software components. EV module 56 periodically accesses repository 4A, or receives notifications from repository 4A, to identify any new or updated artifacts. Upon identifying any such artifact, EV module 56 generates an asset having metadata and data that may include or reference the new or updated artifact. EV module 56 caches an instance of the asset within staging area 58. EV module 56 validates the asset using asset templates 47 to identify whether the asset is ready for publishing, or perhaps requires reconciliation or further artifact data.

More specifically, EV module 56 generates the assets in a form compliant with a data description language, and may include metadata as well as actual artifact data, or references to artifacts stored within either repository 4A or artifact storage 60. Asset source 12A manages artifact storage 60 to store artifact data retrieved from repository 4A as needed, and provides artifact interface 53 for external access. Accordingly, upon publication to asset library 36 (FIG. 2), the stored assets may comprise metadata, artifact data, references to artifact data within artifact storage 60 of one or more asset sources 12 or a central artifact storage, or any combination thereof.

Asset source 12A includes a read-only interface 54 for use by publishing module 24 (FIG. 2) for extracting assets in a normalized form compliant with a data description language. In other words, publishing module 24 invokes read-only interface 54 to direct EV module 56 extract one or more asset from staging area 58. Upon receiving the assets from staging area 58 via read-only interface 54, publishing module 24 stores the assets within asset library 36.

In addition, asset source 12A may include a writable interface 52 that allows asset capture module 26 to augment the artifact information of the underlying repository 4A or artifact storage 60. Asset capture module 26 invokes read-only interface 54 to direct EV module 56 to extract one or more asset from staging area 58. Upon receiving the assets from staging area 58 via writable interface 52, asset capture module 26 augments the artifact data via writable-interface 52 using manual, semi-automated, or automated techniques, as described herein.

The following code illustrates exemplary embodiments for interfaces 52, 53, and 54, that may be provided by asset source 50.

```
/***** Artifact Repository Interface *****/
interface ArtifactRepository {
/* Get the installation unique ID of this ArtifactRepository */
public abstract String getId( );
/* Retrieve the specified artifact from the repository. */
ArtifactStream getArtifact(String assetId, String artifactId);
}
/***** Writable Interface for Artifact Repository *****/
interface WriteableArtifactRepository extends ArtifactRepository {
/* Store the given artifact in the repository */
void storeArtifact(String assetId, String artifactId);
/** Remove the specified artifact from the repository */
void removeArtifact(String assetId, String artifactId);
}
/***** Read-only Interface for Asset Source *****/
interface AssetSource extends AssetRepository {
/* Get the installation unique ID of this AssetSource */
public abstract String getId( );
/* Get the XML representation of the specified asset. */
public abstract String getAsset(String assetId);
/* Get all publish-ready assets available from this AssetSource. Returns a
collection of Strings that are the XML representation of the assets */
public abstract Collection getAssets( );
/* This method is used as a callback from the "consumer" of this
AssetSource, such as the publishing module, to indicate that it is now
using the asset and that the AssetSource should not allow changes to the
visble artifacts of the asset. */
public abstract void publishAsset(String assetId);
/* This method may be used to give the AssetSource an XML structure
consisting of a list of classifier criteria which is then used by the
AssetSource to expose only those assets from its underlying sources that
meet the given criteria. * /
public abstract void setFilter(String classificationCriteria)
/* Register the given consumer, such as the asset capture module or the
publishing module, for notification of new assets or changes to existing
assets. */
public abstract void registerConsumer(AssetSourceConsumer consumer);
}
/***** Writeable Interface for Asset Source *****/
interface WriteableAssetSource extends AssetSource,
WriteableArtifactRepository {
/* Create a new asset into the asset source (used by the asset capture
module to create new assets either from scratch or from existing XML asset
documents. */
public abstract void createAsset(String assetXMLDoc);
/** Update an existing Asset in the repository. */
public abstract void updateAsset(String assetXMLDoc);
/* Remove an Asset from the repository */
public abstract void removeAsset(String assetId);
}
```

Figure 4:
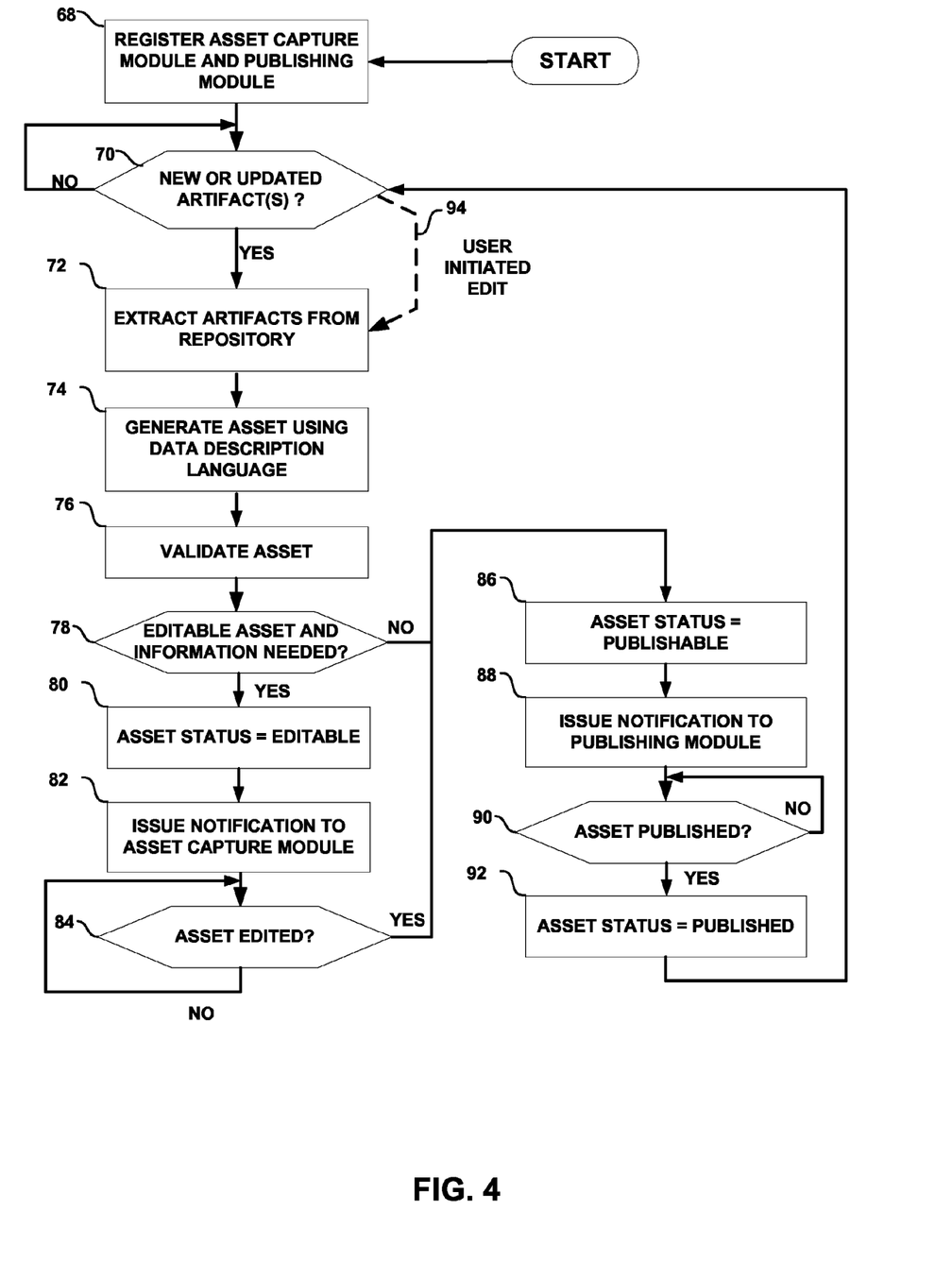
FIG. 4 is a flowchart illustrating in further detail the interactions between the asset management system and the asset sources to facilitate the reuse of assets within an enterprise.

FIG. 4 is a flowchart illustrating in further detail the interactions between an example asset management system 6 (FIG. 1) and asset sources 12 to facilitate the reuse of assets within an enterprise. Initially, publishing module 24 (FIG. 2) and asset capture module 26 of asset management system 6 register with each of asset sources 12 as potential "consumers" of assets (68). During the registration, each of publishing module 24 and asset capture module 26 may communicate a unique communication handle, such as a port number, socket handle, callback pointer, and the like, which asset sources 12 use of to communicate with the modules. In particular, asset sources 12 may use the communication handles to notify publishing module 24 and asset capture module 26 of new or updated assets.

When asset sources 12 detect new or updated artifacts within repositories 4 (70), the asset sources 12 extract the information from repositories 4 (72). Asset source 12A, for example, may extract new or updated artifact information stored within repository 4A. For exemplary purposes, the remainder of FIG. 4 is described in reference to asset source 12A and repository 4A.

After extracting the artifact information, asset source 12A, generates the asset based on the extracted artifact information in a form that complies with a data description language, such as XML, and stores the asset within staging area 58 (74). Asset source 12A selects one or more asset templates 47 that provide an asset schema for controlling the generation. During this process, asset source 12A validates the generated asset to determine whether any additional information is needed to augment or reconcile the artifact information (76).

If, based on the validation, additional information is need to augment or reconcile the artifact information, asset source 12A determines whether the asset is an editable asset, possibly based on configuration information or the asset schema provided by asset templates 47 (78). If so, asset source 12A sets a status of the asset as "editable" (80), and issues notification 28 to asset capture module 26 to indicate that an editable asset is available within staging area 58 (82).

In response, asset capture module 26 provides the required information, possibly in a manual, semi-automated, or fully-automated manner (84). In addition, asset capture module 26 may assist users 8 in reconciling the instance of the asset stored within staging area 58 with a current version of the asset that may be stored within asset library 36. Upon completion of the editing process by asset capture module 26, asset source 12A changes the status of the asset within staging area 58 from "editable" to "publishable" (86). Similarly, if the asset was non-editable, or if additional information was not needed (no branch of 78), asset source 12A bypasses asset capture module 26 and marks the asset as "publishable" (86).

Next, asset source 12A issues notification 32 to publishing module 24 that an asset within staging area 58 is ready for publishing (88). Finally, publishing module 24 retrieves the asset from asset source 12A (90), and publishes the asset to asset library 36, possibly in a manual, semi-automated, or fully-automated manner, thereby making the asset available to users 8 via asset retrieval module 42. Asset source 12A sets the status of the asset within the staging area as "published" (90), and repeats the process for subsequent new or updated asset artifacts.

The update and publication process described above need not be triggered by the detection of new or updated artifact information within a repository. User 8 may, for example, trigger the process by selecting an asset within asset library 36, and initiating an update process (as indicated by dashed line 94). In particular, asset capture module 26 may reconcile the instance of the asset generated by asset module 12A with a current version of the asset stored within asset library 36. User 8 may also initiate the creation of a new asset through this process by selecting one or more template(s) and proceed edit the newly created asset according to the templates.

Figure 5:
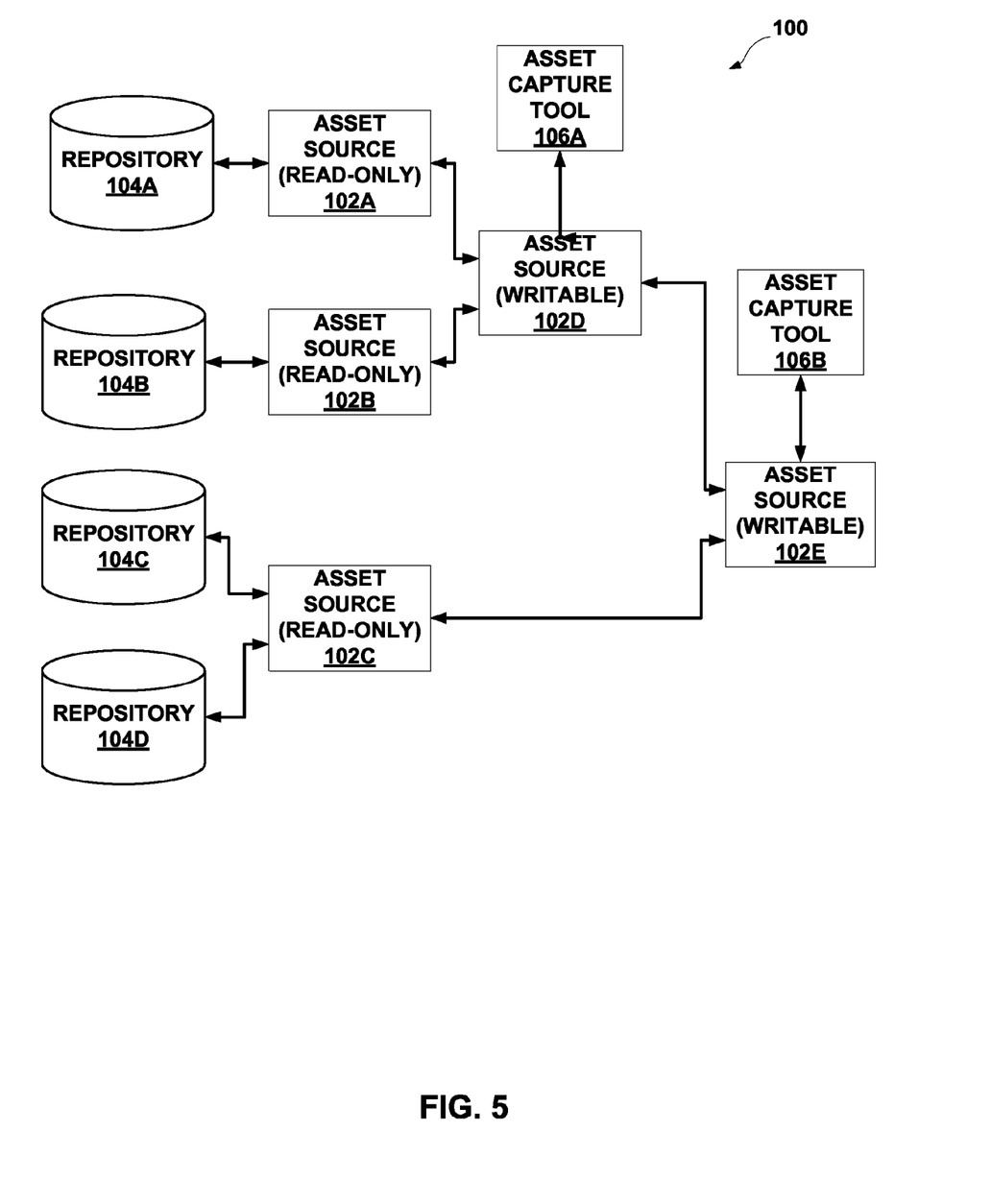
FIG. 5 is a block diagram illustrating an asset source hierarchy.

FIG. 5 is a block diagram illustrating exemplary an asset source hierarchy 100 in which asset sources 102A-102E (herein asset sources 102) are coupled to repositories 104A-D. As illustrated, asset sources 102 need not have a one-to-one relationship with repositories 104, and may be hierarchically arranged to provide multiple abstract levels as assets are captured and published. Hierarchy 100 is illustrated for exemplary purposes. Accordingly, asset sources 102 may be hierarchically arranged as required to capture assets from a wide-variety of environments.

For example, asset sources 102A-102C are coupled to repositories 104, and form a first layer of asset source hierarchy 100. More specifically, asset source 102A is configured to generate assets based on artifacts stored within repository 104A. Similarly, asset source 102B is configured to generate assets based on artifacts stored within repository 104B. Asset source 102C is configured to generate assets based on artifacts stored within repository 104C and repository 104D. In other words, asset source 102C monitors both repository 104C and repository 104D, and generates assets based on new or updated artifacts.

In the illustrated example hierarchy 100, asset sources 102A-102C comprise read-only asset sources, and publish assets to upper levels of asset source hierarchy 100 without invoking a capture tool. Accordingly, asset sources 102A-102C need not support writeable interfaces.

Asset source 102D receives and aggregates assets from asset sources 102A, 102B. In particular, asset source 102D may receive incomplete assets from asset sources 102A, 102B, and may combine the artifacts, or references thereto, of the received assets to form aggregate assets. Asset source 102D may invoke asset capture tool 106A to augment or reconcile the aggregate assets.

Similarly, asset source 102E receives and aggregates assets from asset sources 102C, 102D, and may invoke asset capture tool 106B to augment or reconcile the aggregate assets. Accordingly, the aggregate assets produced by asset source 102E should be complete, and in a state for publishing to asset library 36. Alternatively, asset sources 102D, 102E, for example, may treat assets from each of sources 102A, 102B, 102C as independent assets for publishing to asset library 36.

Figure 6:
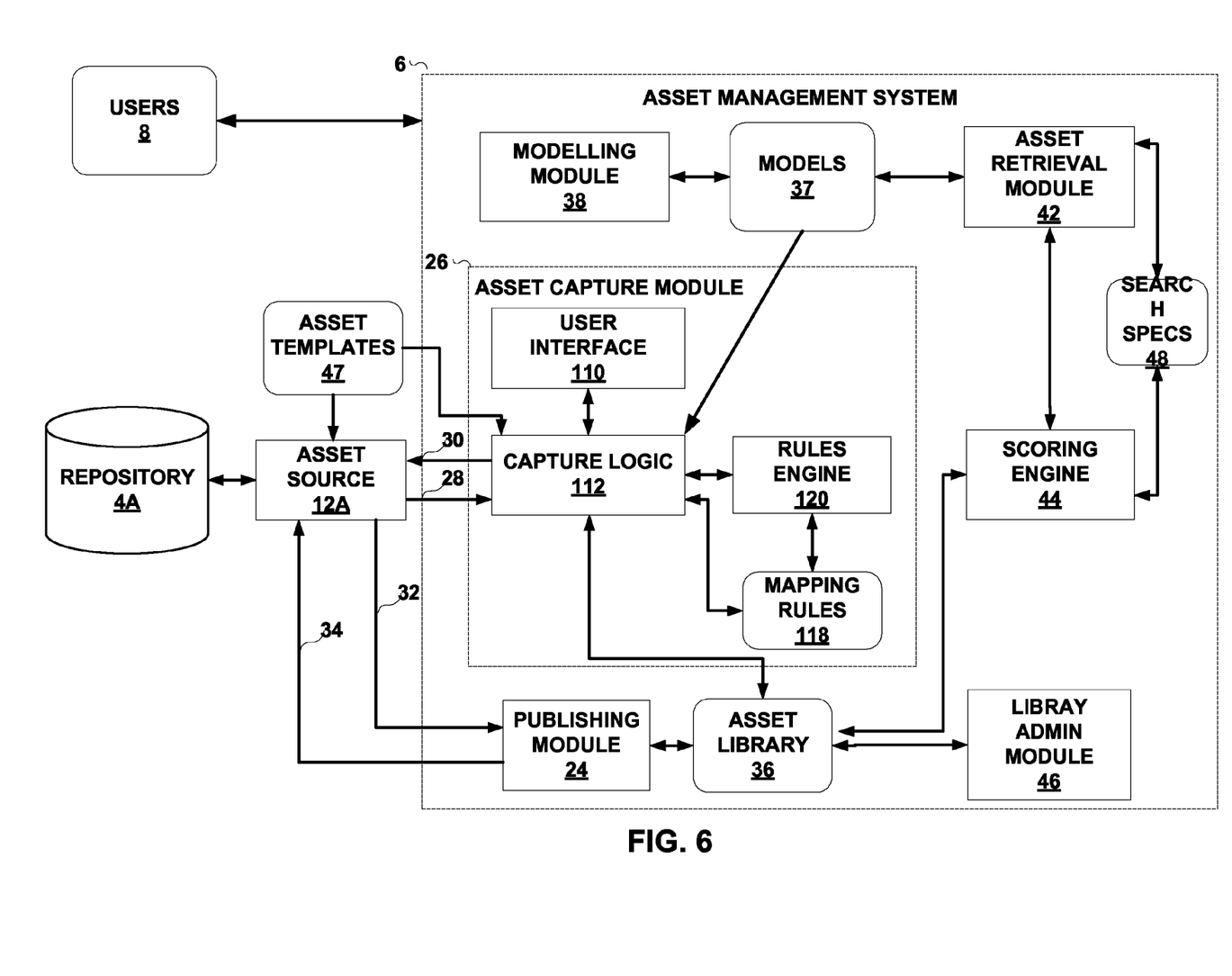
FIG. 6 is a block diagram illustrating in further detail one embodiment of an asset capture module of the asset management system

FIG. 6 is a block diagram illustrating in further detail one embodiment of asset capture module 26 of asset management system 6. For manual or semi-automated generation of assets, users 8 interact with user interface 110 to provide additional asset information, or reconcile the current artifacts captured by asset source 12A from repository 4A. Capture logic 112 drives user interface 110 to interact with users 8 according to asset schemas defined by asset templates 47. In this manner, asset capture module 26 offers users 8 and library administrator 48 (FIG. 2) the flexibility of changing asset capture workflow, as well as the structure and content of the captured assets, by change asset templates 47.

During the process, capture logic 112 maps the artifacts of the asset produced by asset source 12A to searchable elements of models 37. In particular, capture logic 112 makes use of rules engine 120 to map the metadata and artifact data of the generated assets to elements of models 37. During the asset generation process, capture logic 112 allows users 8 or a library administrator 48 (FIG. 2) to dynamically define and modify mapping rules 118 to customize the mapping process. In one embodiment, rules engine 120 may comprise a Java-based rules engine, such as JRules™ from ILOG Incorporated of Paris, France. Other embodiments may implement the mapping process through other techniques, e.g., hard-coded procedural logic.

Figure 7:
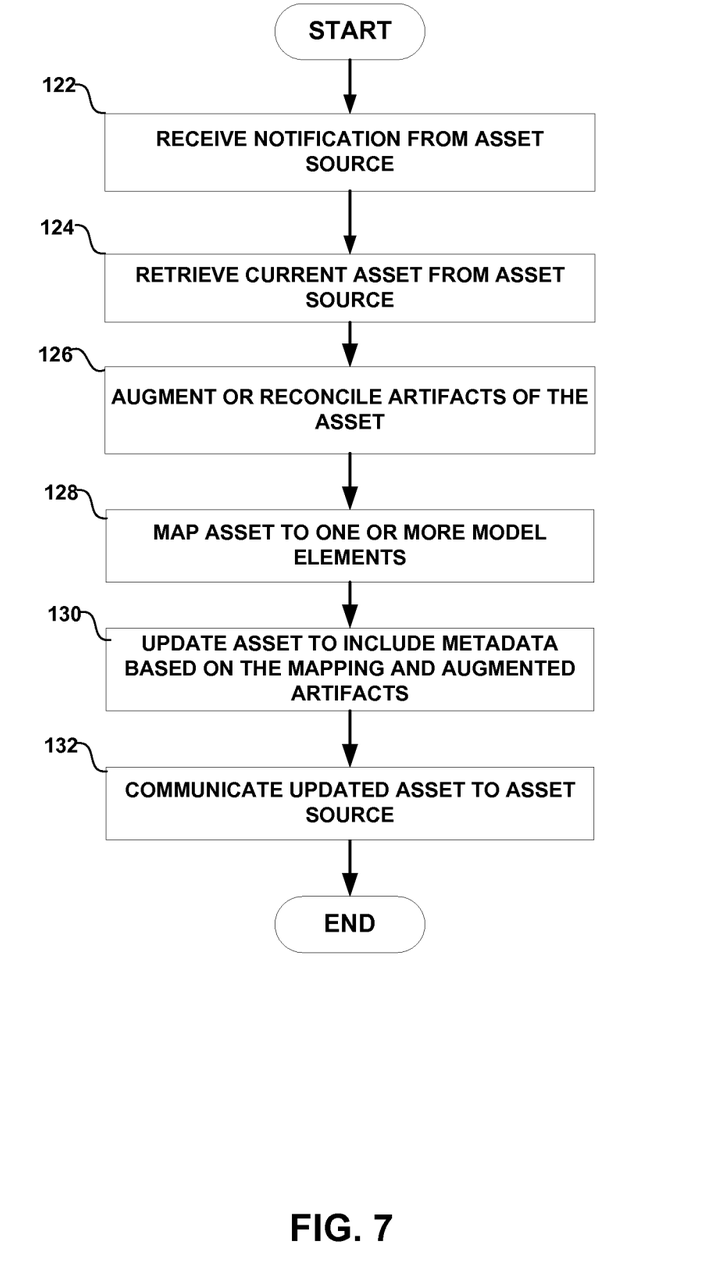
FIG. 7 is a flowchart further illustrating an example mode of operation of the asset capture module.

FIG. 7 is a flowchart further illustrating an example mode of operation of asset capture module 26. Initially, capture logic 112 receives notification 28 from asset source 12A indicating an asset within staging area 58 has been generated and is ready for editing (122). In response, capture logic 112 retrieves the current asset from asset source 12A (124), and augments or reconciles the artifacts of the current asset (126). Based on asset templates 47, as described above, capture logic 112 may drive user interface 110 to capture the required information from users 8. Alternatively, capture logic 112 may invoke one or more scripts or other components to automate the process.

Next, capture logic 112 maps the asset to one or more model elements of models 37 (128). Capture logic 112 may, for example, invoke rules engine 120 to perform the mapping based on mapping rules 118. In addition, capture logic 112 may drive user interface 110 to map the assets to model elements based on input from users 8. In this manner, capture logic 112 builds associations between generated assets and the elements of models 37. Assets may be associated with, for example, interfaces, components, functions, case steps, and other elements that may be described within models 37.

Next, capture logic 112 updates the asset to include additional metadata based on the developed mapping, as well as any additional artifacts and other metadata that may have been provided by users 8 or automated scripts. (130). Finally, capture logic 112 communicates the updated asset to asset source 12A for storage in staging area 58 (132).

U.S. patent application Ser. No. 09/900,101 entitled "Targeted Asset Capture, Identification, and Management" filed Jul. 6, 2001, the entire content of which is hereby incorporated by reference, illustrates one embodiment of user interface 110 and operation of asset capture module 26 generally.

Figure 8:
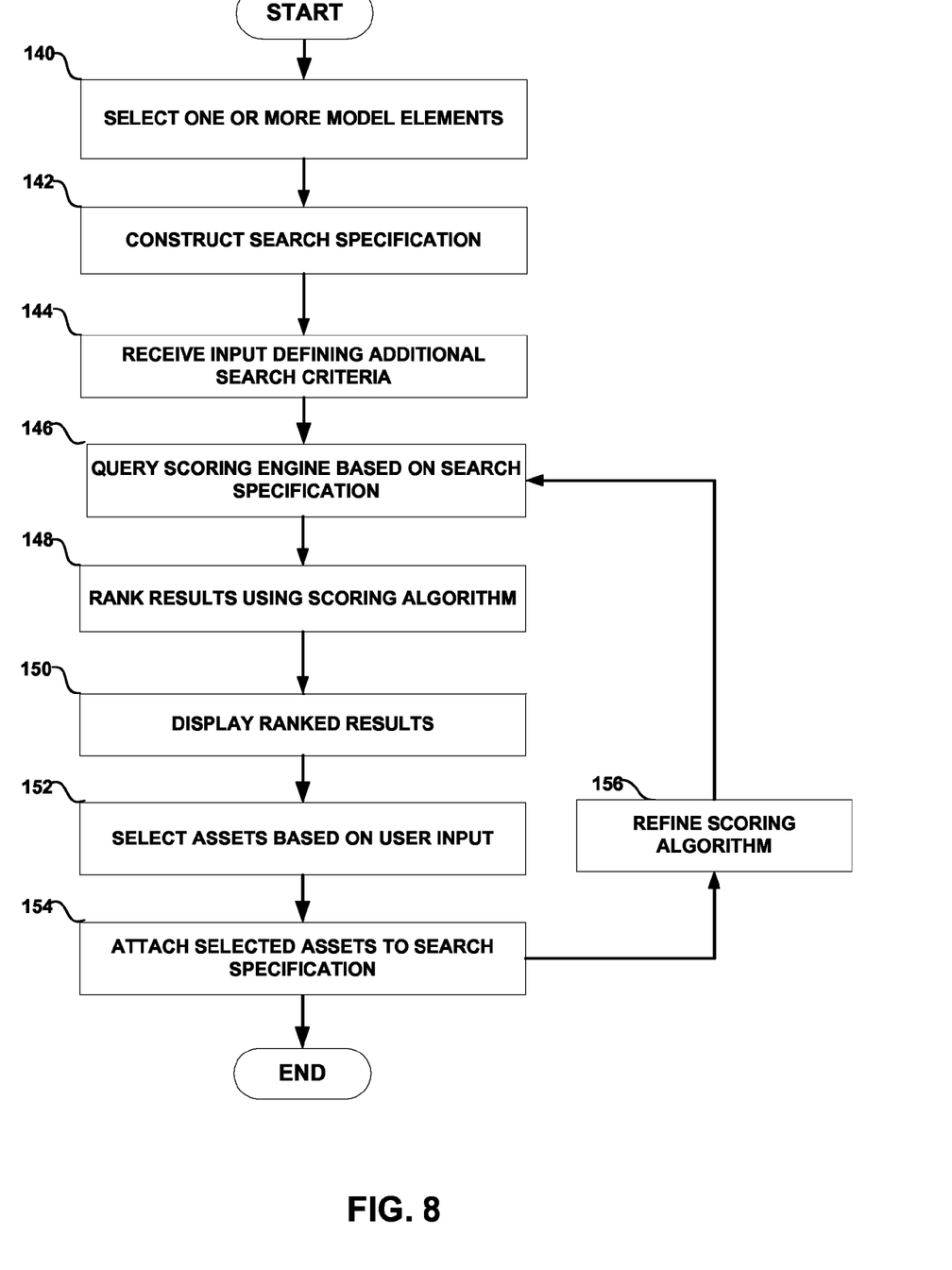
FIG. 8 is a flowchart illustrating an example of retrieving reusable assets from the asset management system.

FIG. 8 is a flowchart illustrating an example operation of retrieving reusable assets from asset management system 6. In response to input from one of users 8, asset retrieval module 42 selects one or more elements of models 37 (140) and constructs a model-based search specification 48 (142). The user may, for example, graphically view one or more of models 37, and identify elements, such as interfaces, components, functions, case steps, and the like, for inclusion within the search specification. In addition, asset retrieval module 42 may receive additional search criteria, such as keywords and other classifiers including an operating system, license type or language, for inclusion within the search specification 48 (144).

Next, asset retrieval module 42 directs scoring engine 44 to search asset library 36 in accordance with the search specification 48 (146). Based on the search specification, scoring engine 44 ranks the assets within asset library 36 using a scoring algorithm that determines, for example, how closely each asset satisfies the criteria of the search specification 48 (148).

Asset retrieval module 42 displays to the user the ranked assets found within asset library 36 by scoring engine 44 (150), and selects one or more of the assets in response to user input (152). Based on user request, asset retrieval module 42 attaches the selected assets to the search specification 48 (154). In this fashion, the user can selectively retain the assets for a software project. In one embodiment, scoring engine adaptively updates the search specification 48 based on the assets attached by the user, thereby dynamically refining scoring algorithm (156).

Various embodiments of the invention have been described. These and other embodiments are within the scope of the following claims.

The invention claimed is:

1. A computer-implemented system comprising:
a plurality of repositories to store artifacts comprising software instructions for a plurality of different software development environments, wherein the artifacts comprise source code written in one or more programming languages of the software development environments;
one or more computers;
a plurality of distributed asset sources executing on the one or more computers to monitor the repositories, detect one or more new or updated artifacts within the repositories, and in response to detecting the new or updated artifacts within the repositories, automatically generate, based on an asset template, one or more software assets in a normalized format that complies with a data description language, wherein each of the software assets corresponds to a set of one or more of the artifacts within the software development repositories and is automatically generated to include metadata that references the respective artifacts stored within the repositories of the software development environments, and wherein the asset template defines one or more schemas to control generation of the software assets from the artifacts; and
an asset management system comprising an asset library and one or more modules, executing on the one or more computers, to receive the software assets from the asset sources, to store the software assets within the asset library, and to selectively retrieve one or more of the software assets from the asset library for reuse within one or more of the development environments.

2. The system of claim 1, wherein the asset source generates the software assets to include references to the artifacts within the repository.

3. The system of claim 1, wherein the asset source generates the software assets in a format that complies with a data description language.

4. The system of claim 3, wherein the data description language comprises the extensible markup language (XML).

5. The system of claim 1, wherein the asset source comprises a staging area to store the software assets prior to storage within the asset library by the asset management system.

6. The system of claim 1, wherein one or more of the asset sources comprises a writable interface for editing the software assets.

7. The system of claim 1, wherein one or more of the asset sources comprises an artifact storage to cache artifacts extracted from the repositories.

8. The system of claim 1, further comprising an asset capture tool to update the software assets based on additional artifacts.

9. The system of claim 8, wherein the asset capture tool includes a user interface to receive the additional artifacts from a user.

10. The system of claim 8, wherein the asset capture tool includes scripts to generate the additional artifacts.

11. The system of claim 1,
wherein the asset management system comprises an asset capture tool to update the software assets in accordance with the asset template, wherein the asset capture tool identifies missing artifacts from the software asset based on the asset template.

12. The system of claim 1, wherein the asset management system comprises a rules engine to generate metadata that maps the software assets to elements of one or more models that graphically represent a set of software components having instructions.

13. The system of claim 12, wherein the asset management system further comprises an asset retrieval module to selectively retrieve one or more of the software assets from the asset library based on the metadata.

14. The system of claim 12, wherein the one or more models comprise at least one of a process model, a structural model, a resource model, and an implementation model.

15. The system of claim 1, wherein the asset management system comprises an asset retrieval module to receive input from a user selecting an element of a model, and to selectively retrieve one or more of the software assets from the asset library based on the input.

16. The system of claim 15, wherein the asset retrieval module generates a search specification based on the user input.

17. The system of claim 16, further comprising a scoring engine to score the software assets within the asset library against the search specification.

18. The system of claim 1, wherein the artifacts comprise one of source code, binary code, a requirements specification, a design document, a model, a use case, and a collaboration diagram.

19. A computer-implemented system comprising:
a plurality of repositories to store artifacts comprising software instructions for a plurality of different software development environments, wherein the artifacts comprise source code written in one or more programming languages;
one or more computers;
a multi-level hierarchy of asset sources executing on the one or more computers to monitor the software development repositories, detect one or more new or updated artifacts within the repositories and in response to detecting the new or updated artifacts within the repositories, automatically generate, based on an asset template, one or more software assets in a normalized format that complies with a data description language, the software assets having metadata that reference the artifacts stored within the repositories of the software development environments, the asset template defining one or more schemas for the software assets in accordance with the data description language, wherein higher-level asset sources of the multi-level hierarchy receive software assets from lower-level asset sources of the hierarchy and combine the received software assets to form aggregate software assets; and an asset management system comprising an asset library and one or more modules, executing on the one or more computers to receive the aggregate software assets from the hierarchy of asset sources, store the aggregate software assets within the asset library, and selectively retrieve one or more of the software assets from the asset library for reuse within one or more of the development environments.

20. The system of claim 19, wherein the asset sources generate the software assets in accordance with asset templates that define schemas for the software assets in accordance with a data description language.

21. The system of claim 19, wherein the asset management system comprises at least two asset capture tools communicatively coupled to different asset sources of different levels of the hierarchy.

22. The system of claim 19, wherein the asset management system comprises a publishing module to retrieve the software assets from the asset sources and to insert the software assets into the asset library.

23. The system of claim 19, wherein the asset management system comprises an asset capture tool that updates the software assets to include metadata that maps the aggregate software assets to elements of a model.

24. The system of claim 23, wherein the asset management system comprises an asset retrieval module to selectively retrieve the software assets from the asset library based on the metadata.

25. The system of claim 19, wherein the asset management system comprises a rules engine to generate metadata that maps the software asset to elements of one or more models.

26. The system of claim 25, wherein the one or more models comprise at least one of a process model, a structural model, a resource model, and an implementation model.

27. A computer-implemented system comprising:
a plurality of repositories to store software artifacts comprising software instructions for a plurality of different software development environments, wherein the software artifacts comprise source code written in one or more programming languages;
one or more computers;
a plurality of distributed asset sources executing on the one or more computers to monitor the software development repositories, detect one or more new or updated artifacts within the repositories, and in response to detecting the new or updated artifacts within the repositories, automatically harvest the new or updated software artifacts from the software development environments and generate, based on an asset template, one or more software assets in a normalized format that complies with a data description language, wherein each of the software assets corresponds to a set of one or more of the software artifacts within the software development repositories and is automatically generated to include metadata that references the respective artifacts metadata that references the respective artifacts stored within the repositories of the software development environments, and wherein the asset template defines one or more schemas to control generation of the software assets from the software artifacts; and an asset management system comprising:
an asset library to store the software assets;
one or more modules, executing on the one or more computers, to receive the software asset from the asset source and to store the software asset within the asset library,
a rules engine to generate metadata that maps the software asset to elements of a model that graphically represents a set of software components having instructions; and
an asset retrieval module to receive input from a user selecting an element of the model and to selectively retrieve the software asset from the asset library based on the input and the metadata that maps the software assets to the elements of the model.

28. The system of claim 27, wherein the asset management system further comprises:
an asset capture tool that identifies missing artifacts from the software asset based on the asset template.

29. The system of claim 27, wherein the model comprises one of a process model, a structural model, a resource model, and an implementation model.

30. The system of claim 27, wherein the asset retrieval module generates a search specification based on the user input.

31. The system of claim 30, further comprising a scoring engine to score the software assets within database against the search specification.

32. A method comprising:
monitoring, with a plurality of distributed asset sources executing on one or more computers, a plurality of repositories that store artifacts comprising software instructions for a plurality of different software development environments, wherein the artifacts comprise source code written in one or more programming languages;
detecting, with the asset sources, one or more new or updated artifacts within the software development repositories;
in response to detecting the new or updated artifacts within the repositories of the software development, automatically harvesting the new or updated artifacts from the software development environments and generating, based on an asset template, one or more software assets in a normalized format that complies with a data description language, wherein each of the software assets corresponds to a set of one or more of the artifacts within the repositories and is automatically generated to include metadata that references the respective artifacts stored within the repositories of the software development environments, and wherein the asset template defining one or more schemas to control generation of the software assets in accordance;
receiving, with an asset management system executing on the one or more computers, the software assets from the asset sources;
storing, with the asset management system, the software assets within an asset library included in the asset management system; and
selectively retrieving, with the asset management system, one or more of the software assets from the asset library for reuse within one or more of the development environments.

33. The method of claim 32, wherein generating the software assets comprises generating the software assets based on new and updated artifacts within the repositories.

34. The method of claim 32, wherein generating the software assets comprises generating the software assets to include references to related artifacts within the repositories.

35. The method of claim 32, wherein the data description language comprises the extensible markup language (XML).

36. The method of claim 32, further comprising storing the software assets within a staging area prior to publication to the asset management system.

37. The method of claim 32, wherein generating the software assets comprises:
identifying additional artifacts required for the software assets; and
invoking an asset capture module to update the software assets to include the additional artifacts.

38. The method of claim 37, wherein invoking the asset capture module comprises invoking scripts to automatically update the software assets.

39. The method of claim 37, wherein invoking the asset capture module comprises invoking a user interface to receive the additional artifacts.

40. The method of claim 37, further comprising publishing the updated software assets to the asset library.

41. The method of claim 32, further comprising:
receiving the artifacts via distributed asset sources; and
communicating the artifacts from the asset sources to a publishing module for insertion into the asset library.

42. The method of claim 32, wherein generating the software assets comprises generating metadata that maps the software assets to elements of one or more models that graphically represent a set of software components having instructions.

43. The method of claim 42, wherein selectively retrieving, with the asset management system, one or more of the software assets from the asset library comprises selectively retrieving the software assets from the asset library based on the metadata.

44. The method of claim 42, further comprising:
receiving input from a user selecting one or more elements of the models,
wherein selectively retrieving, with the asset management system, one or more of the software assets from the asset library comprises retrieving software assets from the asset library based on the selected elements of the model.

45. The method of claim 44, further comprising ranking the software assets of the asset library according to the selected elements of the models.

46. The method of claim 32, wherein the artifact comprises one of source code, binary code, a requirements specification, a design document, a model, a use case, and a collaboration diagram.

* * * * *